(12) United States Patent
Chen et al.

(10) Patent No.: US 10,902,611 B2
(45) Date of Patent: Jan. 26, 2021

(54) SYSTEM AND METHOD FOR DETECTING INACTIVE OBJECTS

(71) Applicant: Logistics and Supply Chain MultiTech R&D Centre Limited, Pok Fu Lam (HK)

(72) Inventors: Hung Kwan Chen, Pok Fu Lam (HK); Chi Hung Tong, Pok Fu Lam (HK); Ka Man Ng, Pok Fu Lam (HK); King Hong Paros Kwan, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 65 days.

(21) Appl. No.: 16/234,693

(22) Filed: Dec. 28, 2018

(65) Prior Publication Data

US 2020/0134836 A1 Apr. 30, 2020

(30) Foreign Application Priority Data

Oct. 30, 2018 (HK) .................. 18113867.3

(51) Int. Cl.
*G06K 9/00* (2006.01)
*G06T 7/20* (2017.01)
*H04N 5/33* (2006.01)

(52) U.S. Cl.
CPC .............. *G06T 7/20* (2013.01); *H04N 5/33* (2013.01); *G06T 2207/10048* (2013.01); *G06T 2207/20021* (2013.01); *G06T 2207/30196* (2013.01); *G06T 2207/30232* (2013.01)

(58) Field of Classification Search
CPC ....... G01J 1/00; G01J 1/02; G01J 1/10; A61B 5/01; A61B 5/04; A61B 5/0093; A61B 5/05
See application file for complete search history.

(56) References Cited

U.S. PATENT DOCUMENTS

2019/0205655 A1* 7/2019 Matsuoka .......... G06K 9/00228

* cited by examiner

*Primary Examiner* — Don K Wong
(74) *Attorney, Agent, or Firm* — Renner, Kenner, Greive, Bobak, Taylor & Weber

(57) ABSTRACT

A system for detecting inactive objects includes a thermal imaging device arranged to acquire a thermal signature of an active object; movement detection processor arranged to process the thermal signature of the active object to monitor for any motion of the active object and whenupon the thermal signature indicates that the motion of the active object is below a movement threshold, determine that the active object is inactive.

32 Claims, 5 Drawing Sheets

Camera installation in front of the person 200F

Camera installation at the back of the person 200R

Fig. 4b Foreground object extracted

Fig. 4a Raw image from the low resolution thermal camera

SYSTEM AND METHOD FOR DETECTING INACTIVE OBJECTS

TECHNICAL FIELD

The present invention relates to a system and method for detecting inactive objects, and particularly, although not exclusively, to human subjects who are inactive or incapacitated.

BACKGROUND

In the healthcare industry, a significant amount of resources are spent on the monitoring of individuals under care. Often, this is in the form of hiring additional staff to supervise individuals under care, including elderly persons or persons with medical conditions or physical disabilities.

Electronic devices have been invented to assist in the monitoring process, including the use of personal alarms and devices. More recently, with the developments of wearable devices, users are now able to wear a wearable device to monitor their movements and raise alarms with caregivers when the device detects any abnormalities.

However, despite advances in this area, certain individuals do not always want to carry a wearable device. This is particularly the case with elderly persons who are not used to wearable technology or find that such devices are intrusive into their daily lives. In other situations, certain activities may also mean wearable devices are not suitable given the environment in which they are required to operate in. Accordingly, despite the fact that these devices will often provide assistance to users, elderly or otherwise care required persons may choose to not use them, resulting in gaps in the supervision and care of these users.

SUMMARY OF THE INVENTION

In accordance with a first aspect of the present invention, there is provided a system for detecting inactive objects comprising:
  a thermal imaging device arranged to acquire a thermal signature of an active object;
  movement detection processor arranged to process the thermal signature of the active object to monitor for any motion of the active object and
whenupon the thermal signature indicates that the motion of the active object is below a movement threshold, determine that the active object is inactive.

In an embodiment of the first aspect, the movement detection processor continuously acquires and processes the thermal signature of the active object during a detection period.

In an embodiment of the first aspect, the acquired thermal signature is divided into a plurality of portions, with each of the portions further processed to determine whether each portion is dynamic or static.

In an embodiment of the first aspect, when the number of dynamic portions of the thermal signature is below a predetermined movement threshold, the active object associated with the thermal signature would be determined to be inactive.

In an embodiment of the first aspect, the each of the plurality of portions are determined to be dynamic or static by measuring for any variance rates in the portion.

In an embodiment of the first aspect, the each of the plurality of portions are determined to be dynamic if the variance rates exceed a predefined variance rate over a predefined period of time.

In an embodiment of the first aspect, the thermal signature is an image or a stream of images captured by a thermal optical device.

In an embodiment of the first aspect, the plurality of portions includes one or more pixels of an image or stream of images.

In an embodiment of the first aspect, the movement detection processor processes a stream of thermal images to establish the presence of the active object.

In an embodiment of the first aspect, the movement detection processor tracks the active object within each image of the stream of thermal images and acquires new thermal signatures of the active object over a period of time.

In an embodiment of the first aspect, the detection period is initiated when the active object is first captured within the stream of thermal images.

In an embodiment of the first aspect, the active object is first captured within the stream of thermal images by comparing an earlier thermal image and a subsequent thermal image within the stream of thermal images.

In an embodiment of the first aspect, the detection period is terminated when the active object is detected to leave the stream of thermal images.

In an embodiment of the first aspect, the active object is detected to leave the stream of thermal images by comparing an earlier thermal image and a subsequent thermal image within the stream of thermal images.

In an embodiment of the first aspect, the thermal optical device is a low resolution thermal camera.

In an embodiment of the first aspect, the low resolution thermal camera is arranged to capture outlines of objects with minimal detail of the objects.

In an embodiment of the first aspect, the thermal optical device is placed above a working area.

In an embodiment of the first aspect, the working area includes one or more heat sources.

In accordance with a second aspect of the present invention, there is provided a method for detecting inactive objects comprising the steps of:
  acquiring a thermal signature of an active object;
  processing the thermal signature of the active object to monitor for any motion of the active object and
whenupon the thermal signature indicates that the motion of the active object is below a movement threshold, determine that the active object is inactive.

In an embodiment of the second aspect, the step of processing the thermal signature to monitor for any motion of the active object includes continuously acquiring and processing the thermal signature of the active object during a detection period.

In an embodiment of the second aspect, the acquired thermal signature is divided into a plurality of portions, with each of the plurality of portions further processed to determine whether the each of the plurality of portions is dynamic or static.

In an embodiment of the second aspect, when the number of dynamic portions of the thermal signature is below the predetermined threshold, the thermal signature associated with the active object would be determined to be inactive.

In an embodiment of the second aspect, the each of the plurality of portions are determined to be dynamic or static by measuring for any variance rates in the portion.

In an embodiment of the second aspect, the each of the plurality of portions are determined to be dynamic if the variance rates exceed a predefined variance rate over a predefined period of time.

In an embodiment of the second aspect, the thermal signature is an image or a stream of images captured by a thermal optical device.

In an embodiment of the second aspect, the plurality of portions includes one or more pixels of an image or stream of images.

In an embodiment of the second aspect, the step of acquiring the thermal signature includes processing a stream of thermal images to establish the presence of the active object.

In an embodiment of the second aspect, the step of acquiring the thermal signature further includes tracking the active object within each image of the stream of thermal images and acquiring new thermal signatures of the active object over a period of time.

In an embodiment of the second aspect, the detection period is initiated when the active object is first captured within the stream of thermal images.

In an embodiment of the second aspect, the active object is first captured within the stream of thermal images by comparing an earlier thermal image and a subsequent thermal image within the stream of thermal images.

In an embodiment of the second aspect, the detection period is terminated when the active object is detected to leave the stream of thermal images.

In an embodiment of the second aspect, the active object is detected to leave the stream of thermal images by comparing an earlier thermal image and a subsequent thermal image within the stream of thermal images.

In an embodiment of the second aspect, the thermal optical device is a low resolution thermal camera.

In an embodiment of the second aspect, the low resolution thermal camera is arranged to capture outlines of objects with minimal detail of objects.

In an embodiment of the second aspect, the thermal optical device is placed above a working area.

In an embodiment of the second aspect, the working area includes one or more heat sources.

BRIEF DESCRIPTION OF THE DRAWINGS

Embodiments of the present invention will now be described, by way of example, with reference to the accompanying drawings in which.

DETAILED DESCRIPTION OF ILLUSTRATIVE EMBODIMENTS

Figure 1:
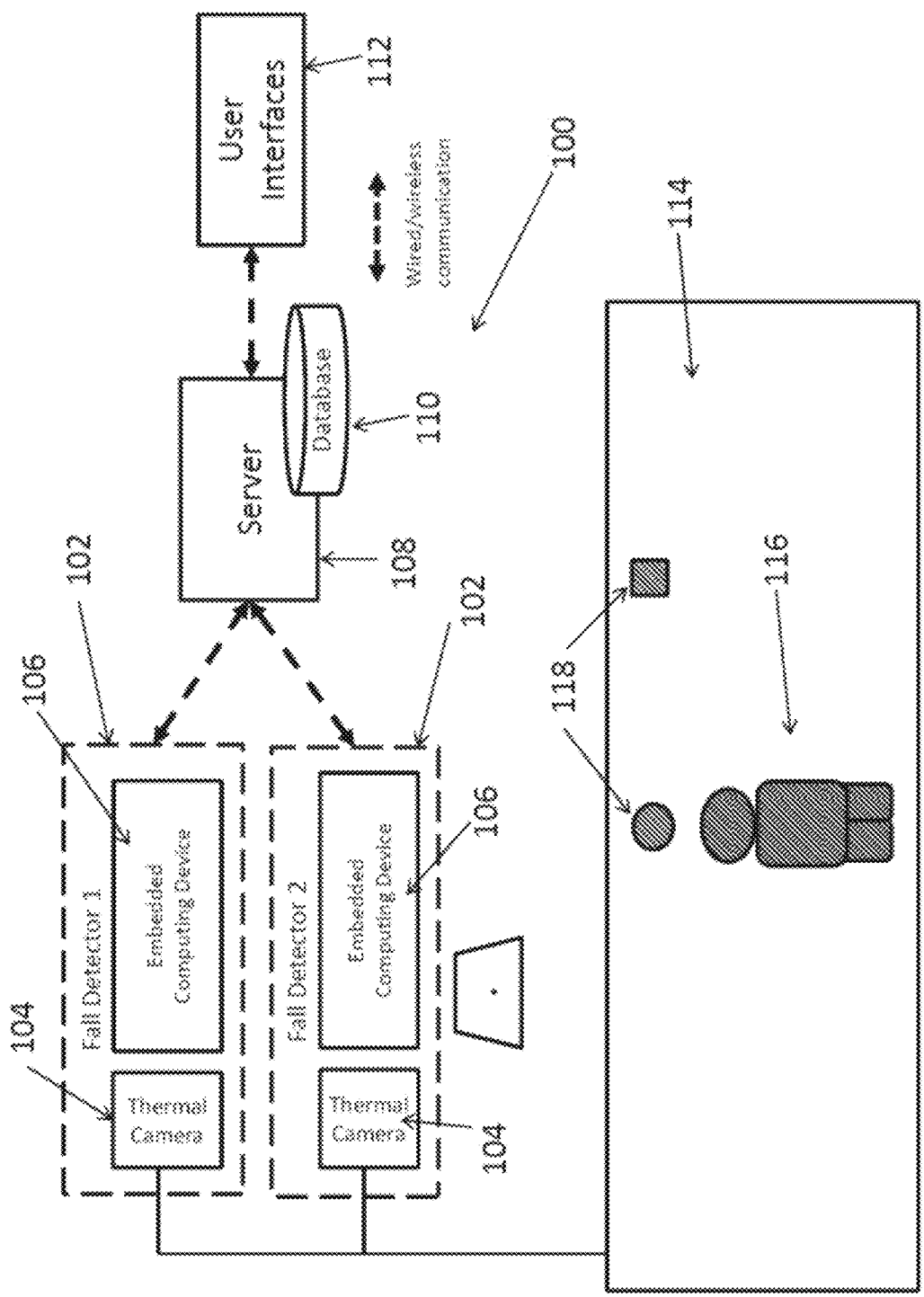
FIG. 1 is a block diagram illustrated an example embodiment of a system for detecting inactive objects.

With reference to FIG. 1, there is illustrated a block diagram of a system for detecting inactive objects 100 comprising: a thermal imaging device 104 arranged to acquire a thermal signature of an active object 116; and a movement detection processor 106 arranged to process the thermal signature of the active object to monitor for any motion of the active object and whenupon the thermal signature indicates that the motion of the active object is below a movement threshold, determine that the active object is inactive.

In this example embodiment, the system for detecting inactive objects 100 may be operated by an operator as a fall detection system for various users such as elderly persons or persons with physical disabilities or difficulties with movement. The system 100 may be arranged to operate so as to detect for whether a user 116 would have fallen over in a specific working space, and in turn, alert any caregiver first aider or any other person able to offer assistance.

As shown in this example embodiment, the system 100 includes a thermal imaging device 104, which may be a thermal camera arranged to capture thermal images. This thermal imaging device may then be in communication with an electronic or computing device 106 arranged to process the thermal images captured by the thermal imaging device to determine if there is any inactivity of a user and thus indication that the user may have fallen or otherwise become inactive. By processing the thermal images, the electronic computing device 106 may in turn operate as a movement detection processor 106 arranged to detect if the object as captured in the thermal images are moving or not moving.

As shown, the motion detection processor 106 may be built into a single device 102 which also includes the thermal imaging device 104, or alternatively, the motion detection processor 106 may also be implemented as separate devices arranged to communicate with each other and with one or more thermal imaging devices 104. A computer server 108 may also be connected to the thermal imaging device 104 or movement detection processor 106 to collect data from the thermal imaging device 104 and/or the movement detection processor 106. As the person skilled in the art would appreciate, it is also possible that the movement detection processor 106 be implemented into the software of the server 108 with the raw thermal images captured by the thermal imaging device 104 being transmitted to the server 108 for processing, as depending on the implementation requirements.

Preferably, the thermal imaging device 104 is connected and controlled by an embedded computing device 106 which is implemented with the thermal imaging device 104 as a single unit 102 for deployment as a movement detection device. The thermal imaging device 104 is arranged to capture a stream of thermal images of a working area 114 where users 116 are likely to be. Such working areas may include, for example, toilets, rest areas, showering areas, kitchens, laundry, saunas, steam rooms or any other areas where a person needs to be monitored. When the thermal imaging device 104 captures a stream of thermal images, these images are then processed by the motion detection processor 106 implemented in either hardware, software or a combination of both within the embedded computing device 106. In turn, the single device 102 may be referred to as a movement detector device 102 and may be used, as it will be explained below, as a fall detection device 102 arranged to detect if a person 116 has fallen over in the working area 114 and requires assistance. This may be performed on the basis that a person 116 who has fallen over would become inactive and requires assistance, thus users 116 who fall over, but may otherwise be active to stand up from the fall within a short period of time may not necessarily be considered as a fall event by the system 100.

Once the thermal images are captured and transmitted to the motion detection processor processing 106, the motion detection processor 106 may then proceed to determine if a specific object of interest has entered the stream of thermal images and continue to monitor the thermal signature of this specific object. In examples where the system 100 is used to monitor elderly persons, the specific object would be a person 116 who would appear within the stream of thermal images when the person 116 enters into the view of the thermal imaging device 104. Once the person 116 enters into the view of the thermal imaging device 104, the motion detection processor 106 would determine that there is a thermal signature of a person 116 as the person 116 would radiate heat and thus allowing the thermal camera 104 to capture the signature of the person 116.

Once the heat signature of the person 116 is first detected in a first thermal image, the motion detection processor 106 may then proceed to track this signature in subsequent frames of the thermal image stream with each frame showing some form of motion or movement of the person 116. Once it is established that the person 116 or object is moving or in motion by comparing the changes between the present image and a previous image within the stream of thermal images, then the thermal signature, which would be associated with this person 116 or object would continue to be monitored or tracked by the motion detection processor 106 and considered an active object until such time that the person leaves the view of the thermal imaging device 104. As an example, the person 116 is determined to have left the working area 114 when the tracked object is no longer within the stream of thermal images. This tracking process of the thermal signature of an active person 116 or object is particularly useful in environments 114 where there are multiple heat emitting sources 118, such as in shower rooms, saunas, kitchens and steam rooms. In these environments, inactive heat sources may also emitted heat and thus have its own thermal signature, but by tracking only active signatures that may follow a particular characteristic of a person or other objects of interest, only thermal signatures that are relevant to the alerts that are required may be issued by the system 100, in turn reducing false alarms and minimizing efforts of supervisors or caregivers.

During this monitoring or tracking process, the thermal signature of the active object 116 is continuously processed with each thermal signature being compared with a subsequent thermal signature. If the comparison indicates that there are changes between the thermal signatures over a specific time difference and that these changes meet a minimum threshold, then the active object is considered to be active as the object is moving over a period of time. However, if the comparison of the two thermal signatures over the specific time period indicates that there are no changes or only minimal changes between the signatures (below the threshold), then it may indicate that the object 116 has become inactive, and thus an alert or alarm may be sounded by communicating with the server 108 or other external devices 112 so as to call for assistance from other parties.

As shown in this example embodiment, a working area 114 such as various facilities in an age care home may have a central server 108 or computer system which can communicate with multiple movement detection devices 102 installed throughout the age care facility. Each of these devices 102 may communicate with the server 108 that may record any images (if desired in certain deployments where privacy may not be a significant concern or if privacy may be a concern, preferably low-resolution thermal camera is used as part of the device 102) and any data obtained from these devices into a database 110 for logging or alert purposes. The server 108 would also be accessible by other computing devices 112, either in proximity to the server 108 or remote from the server 108 to access information on the server 108 as well as to monitor the operations of the movement detection devices 102.

In the event that a person 116 has fallen over, say in a shower facility, the movement detection device 102 would identify that the person 116 has suddenly become inactive, since the person 116 has fallen over and is unable to move. In this example, a signal may then be transmitted to the server 108 which will in turn record this signal as well as to trigger for alarms to user interfaces 112 (speakers, lights) or smart devices 112 carried by carers to be made aware of the fall so as to summons assistance to the user who had fallen.

In another example embodiment of the system for detecting inactive objects 100 where the system 100 is used to detect for fallen over users 116 within one or more specific spaces, the system may be deployed to include one or more movement detecting devices 102, each operating as a fall detector to detect if a user 116 has fallen over or otherwise become inactive in one or more spaces. Preferably, the fall detector 102 should use a thermal camera 104 which has a low resolution (e.g. not exceeding 40×30 pixels) and an embedded computing device 106 to process the data acquired by the thermal camera 104 before transmitting the signal to the server 108.

As stated in various examples, the processing of the data may include inactivity recognition to detect fall event experienced by a user. The processing of the data may also include a context-aware detection process to differentiate humans from other hot or heat emitting objects to reduce false positive alerts. This is particularly useful as the usage of a thermal camera may also capture other non-human objects which are heat radiating, such as shower heads, steam jets or boilers etc, but activities of which are not of concern and thus by using a context-aware detection process, inactivity of these objects would not raise the necessary alarm. Examples of the context-aware detection process are further described below with reference to FIG. 3.

In turn, the processing result, such as a signal indicating a fall event, is sent together with other information (e.g. location of the fall detector, time and other information) to the server 108 through a communication network such as a wired/wireless network.

In some examples, the image acquired by the thermal camera may also not be sent out by the fall detector 102 through any means to prevent privacy sensitive images from being stored or transmitted. This is particularly advantageous in deployments where the system 100 is used to detect for falls in showering rooms where users 116 are likely to be naked or otherwise conducting private matters. A low resolution thermal camera 104 and the proper processing and non-transmission of images help to ensure a user's privacy or personal space are not violated.

In turn, each fall detector 102 may also be connected with a server 108 so as to further communicate with other user portable devices 112 (e.g. smartphones, tablet computers held by caregivers) or user interfaces 112 (which may include, without limitations, audio alarms, visual alarms, alerts sent to pagers, smartphones or computers, security alerts etc). This server 108 may also be integrated into each fall detector 102, thus allowing each device 102 to operate as a server 108 to communicate with other fall detector devices 102 or user portable devices 112, although preferably, in a number of deployments, the server 108 may be a separate network server 108 managed by an establishment such as a hospital or care facility.

The server 108 may also be arranged to collect information sent from the fall detectors and consolidates this information into a database 110, either local, remote or cloud based. Once a fall event is received from any one of the fall detectors 102, the relevant information may be extracted from the database 110 and sent to the user interfaces 112 for further actions.

Figure 2A:
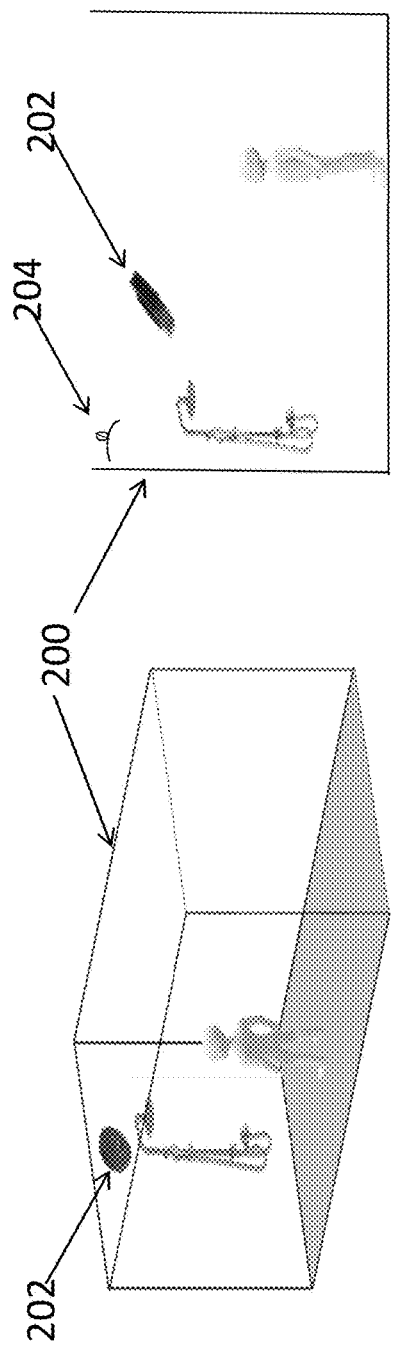
FIG. 2A is a diagram illustrating an example deployment of the system of FIG. 1 in a shower room.
Figure 2B:
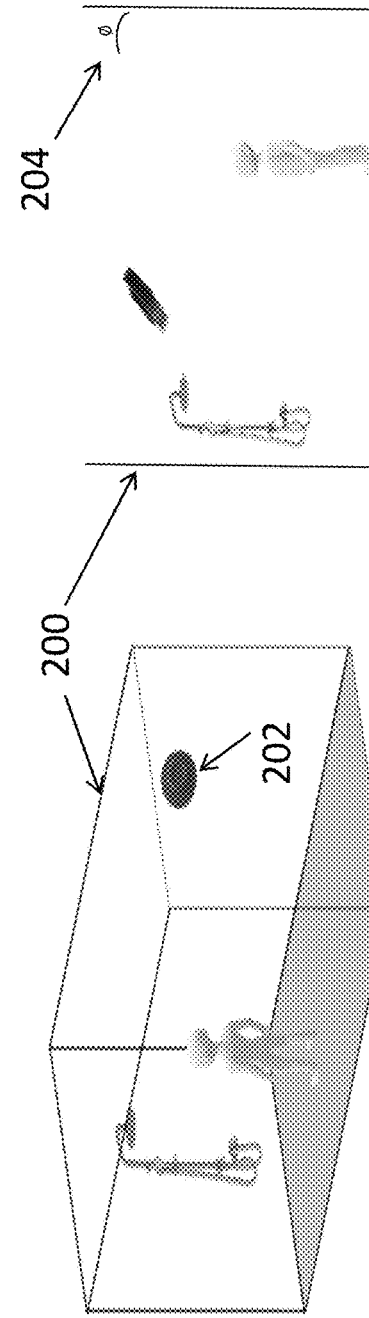
FIG. 2B is a diagram illustrating another example deployment of the system of FIG. 1 in a shower room.

With reference to FIGS. 2A and 2B, there is shown an example of a suitable placement position of the movement detection device in a shower room setting. As indicated previously, one suitable deployment of the system for detecting inactive objects 100 is for use in a shower facility 200 where users, such as elderly persons or persons with mobility problems may suffer from falls or may become otherwise incapacitated during an accident or medical episode.

As illustrated in this example embodiment, the movement detection device 202 may be placed in an overhead area with an angle (Ø) 204 tilting down so as to capture mostly the head and a minimal portion of the upper body part of the person. Preferably, there are two installations positions of the movement detection device 202, either in front of the person 200F or behind the person (facing the back of the person) 200R, or if necessary, in both position as desired by the implementation as required.

These installation positions 200F, 200R are advantageous as placement of the device 202 in an overhead area avoids water spilling onto the device so that the device does not need to be strongly water-proofed. This can ensure the device can be constructed to be as inexpensive as possible.

Additionally, limiting the capture of thermal images of the user to only the head and minimal upper body of the person can reveal minimal visual detail of the person when the person is in their privacy space (e.g. naked during showering). In turn, this arrangement will assist in avoiding the intrusion of the user's personal space as well as to reduce any privacy concerns experienced by the user.

Figure 3:
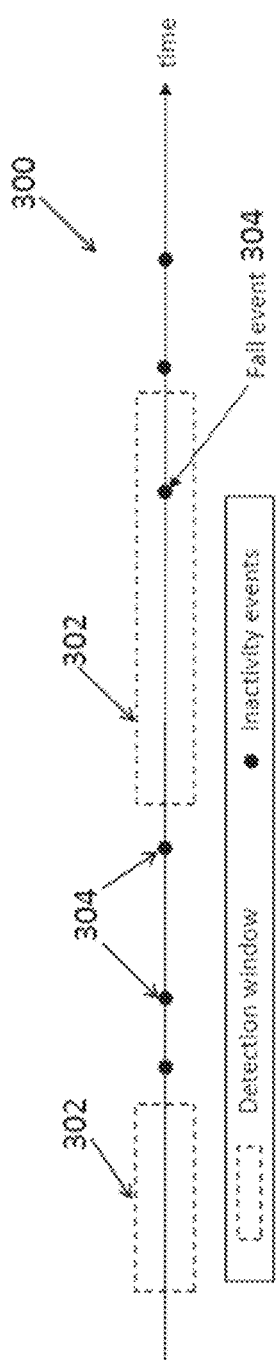
FIG. 3 is a timeline illustrating an example operation of a detection window to detect inactivity events.

With reference to FIG. 3, there is illustrated a time line 300 which shows the activation of a detection period 302 or detection window for the system for detecting inactive objects 100, and thus showing an example of a context-aware detection process to minimize any false alerts. In this embodiment, the detection period 302 is a limited amount of time, or window, in which an alert or alarm 304 would be raised if a detection of an active object becomes inactive. In this embodiment, if the movement detection processor determines that an active object becomes inactive 304, but this event occurred outside of a detection period or window 302, then no alarm would be raised, instead the detection would be ignored. This is due to the context of the alert being not of a concern to the system for detecting inactive objects 100.

This example embodiment is particularly advantageous in showering rooms, steam rooms or saunas or any other rooms or areas where there are more than one heat sources. In these areas or rooms, hot objects can be commonly found such as hot water, hot shower head, boilers, hot coals, steam vents etc). In turn, as the system 100 relies on processing thermal signatures, these hot objects may trigger inactivity events that are actually false positives or are unnecessary. This is particularly the case where these objects are moving objects (e.g. shower heads), or varies in temperature, such as in the case of steam vents which may operate periodically to maintain the temperature of the steam room.

To filter these false positives so as to minimize the number of false alerts or alarms, the context-aware detection process may be used to define and operate a detection window 302 for the system for detecting inactive objects 100 when the context of the detection 304 is relevant to the purpose of the system.

In one embodiment, the detection period 302 is initiated or opened when the movement detection processor 106 first detects an object 116 has entered into a work area 114, such as a showering area or steam room. This may be performed by detecting for a moving persons or object's thermal signature so as to start the detection period. The detection of a person having moved into the work area 114 would indicate a change in context to that an active person now requires monitoring. In turn, when the moving person 116 or object is detected to leave the working area 114, then the detection period 302 is closed, thus other changing heat sources that are part of the working area 114 will not trigger any unnecessary alarms or alerts since the context would indicate that there are no persons or objects of relevance in the work area 114.

Figure 4:
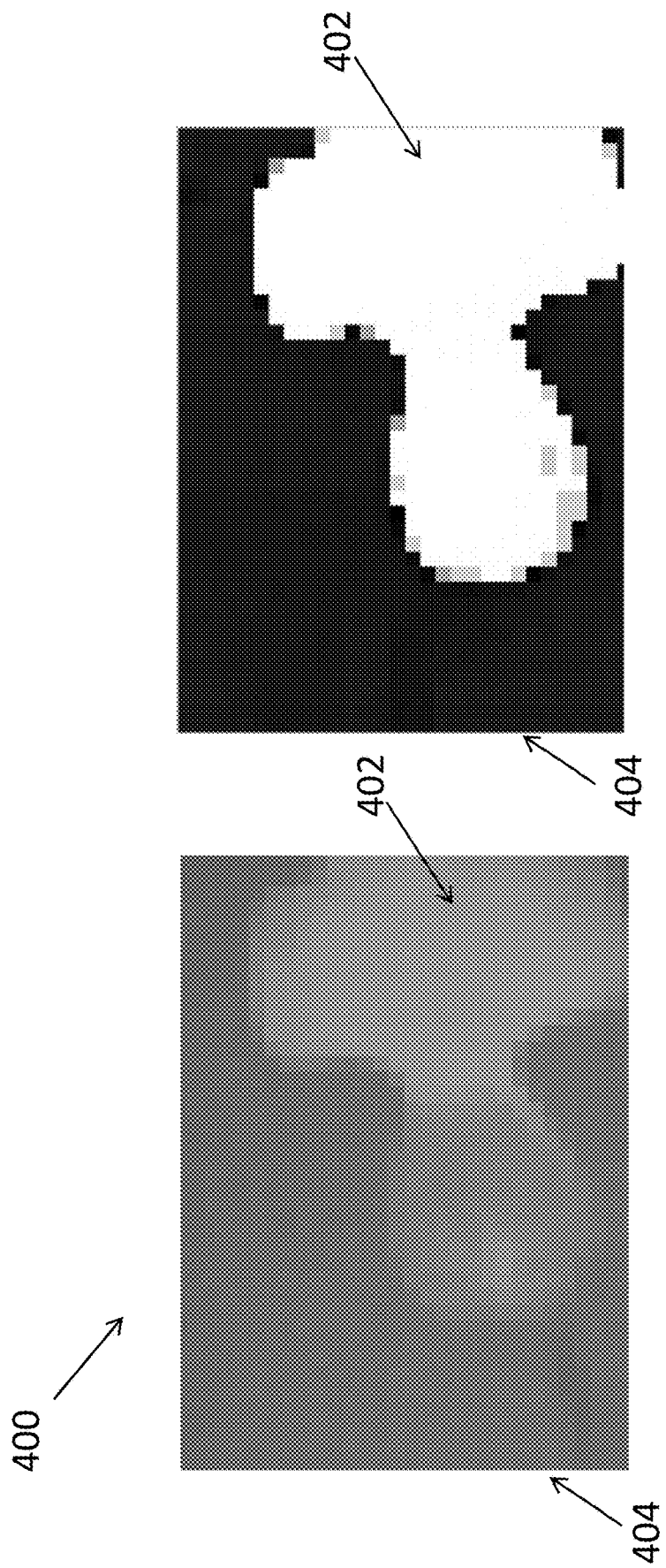
FIG. 4A is an example raw thermal signature of an active object as captured by the system of FIG. 1.
FIG. 4B is the processed raw thermal signature of FIG. 4A.

With reference to FIGS. 4A and 4B, there are shown the results of the processing of the thermal signatures of an active object by the movement detection processor to detect an active object and to monitor for and recognize any motion of the active object. In this example embodiment, the inactivity recognition is performed with a pixel-level monitoring process to detect an inactive person that may have suffered a fall event or become inactive.

In this example, the pixel-level monitoring process operates to detect inactivity event by tracking the value of each portion of the thermal signature associated with the active object, such as a cluster of pixels associated with the active object or preferably where low resolution images are used, each portion is each pixel of the active object as shown in the thermal signature. The pixel is regarded as inactive if the pixel value remains steady under a certain variance for a period of time. If the proportion of the inactive pixels to the overall pixels of the foreground object is above a certain threshold, it is then treated as an inactivity event. Thus mathematically, this process can be expressed as follows:

1—Each pixel value of a foreground object (e.g. the active person) $fg(x,y)$ at time t is compared with its mean $\overline{fg(x,y)}$.

2—If the difference between $fg(x,y)$ and $\overline{fg(x,y)}$ is smaller than a user-defined variance 6 for a user-defined period T, that pixel value is regarded as static pixel $sfg(x,y)$. Thus no change has been registered for that pixel.

3—If the ratio between the total number of static pixel $\Sigma sfg(x,y)$ and the total number of foreground object's pixel $\Sigma fg(x,y)$ is larger than a user-defined threshold R, the foreground object (the active person) is determined to be inactive.

The result of this detection process is that the foreground object 402 within the thermal image 400 would be processed for movement detection, meaning all other objects in the background 404, without a substantial thermal signature would be ignored. Furthermore, existing hot objects within the work area may be dynamic or static, but as these may not be considered to be a foreground 402 object, their status would not affect the detection of the active or inactive status of the foreground object 402, which is likely to be the user or object that requires monitoring.

The manner in which this example detection process is performed is advantageous as it can operate with low resolution thermal images. Other forms of detecting inactivity require analysis of the motion traces. This is difficult in showering room due to a number of reasons, including:

1—The motion traces of a fall is indifferentiable with normal movement under the viewing angle of the installed camera in our design; and, 2—The motion traces are very noisy because showering area is usually very small and thus a high resolution thermal camera may be necessary. However, this capture of high resolution details of users is highly undesirable when users are in the showering room or steam room where privacy is necessary.

Figure 5:
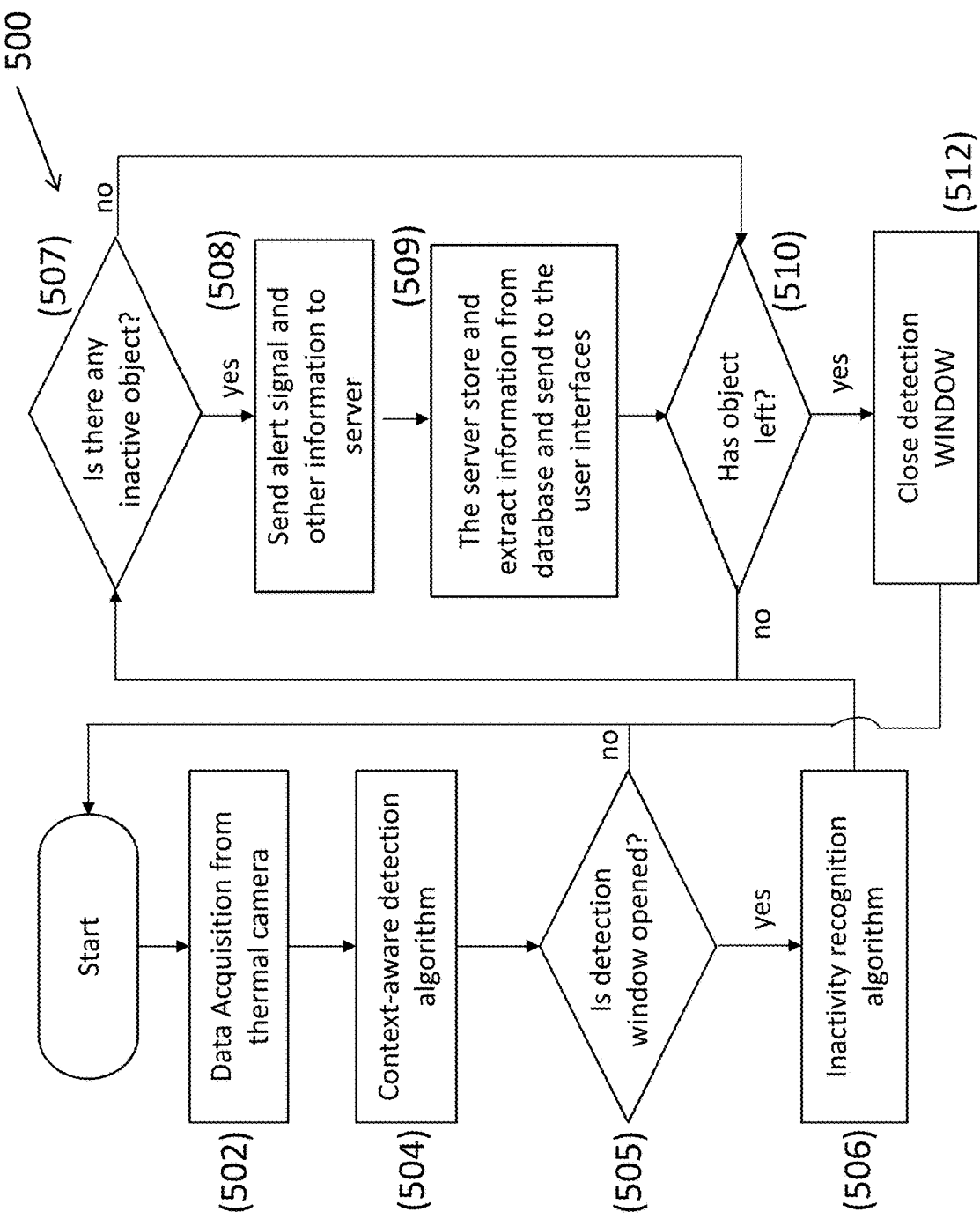
FIG. 5 is a flow diagram illustrating an example operation of the system of FIG. 1.

With reference to FIG. 5, there is illustrated a flow chart 500 for how the system for detecting inactive objects 100 may operate in accordance with one operation example. In this example, the thermal image device, such as a thermal camera would continuously acquire images (502) to identify any thermal signatures of an active object or person. This invokes a context-aware detection process (504) which may be expressed to operate as a state machine. In this example implementation, the state machine may include four states. These states are as follows:

1—IDLE state: The system will stay at IDLE state if there is no foreground object detected;
2—DECISION state: The system will use inactivity recognition algorithm to observe the foreground object for a period of time. If there is no foreground object observed, it will jump to IDLE state. If there is activity of the foreground object, it will jump to ACTIVE state. If there is no activity of the foreground object, it will jump to INACTIVE state;
3-ACTIVE state: There is foreground object detected. The detection window is kept opened in this state where any inactivity event occurs in this state will be treated as fall event; and,
4—INACTIVE state: There is foreground object detected but the detection window is closed. Any inactivity event occurs in this state will not be treated as fall event.

In this example embodiment, to change between the states, IDLE, ACTIVE and INACTIVE, the states can jump to each other state only through the DECISION state. There are several factors (either one or a combination of them) that can trigger the state machine to go to DECISION state. As an example, these factors occur when a person goes into or leave the showering area that includes, but are not limited to:

Area of the foreground object enlarges or shrinks which can be determined through blob analysis of their thermal signature;

The centroid of the foreground object moves along the direction where person go into or leave the showering area;

The foreground object is at the boundary of the image where, in real world, it is outside the showering area.

In turn, if a foreground object associated with an active person is detected, the detection period or detection window is initialised or opened (505) and the motion detection processor will continue to monitor for movement or motion in the thermal signature of the active object or person.

At this stage if there is any inactivity detected (506, 507), an alert signal or other information may be sent to the server (508). The server may then also store and extract information from the database (509) and have this information sent to the user interface of a supervisor or portable devices held by caregivers or supervisors. If there is no inactivity detected (507), when the active person leaves the working area (510), the detection window is then closed (512), restarting the entire process as it waits for the next person to enter the working area.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A system for detecting inactive objects comprising:
a thermal imaging device arranged to acquire a thermal signature of an active object; and
movement detection processor arranged to process the thermal signature of the active object to monitor for any motion of the active object;
wherein the movement detection processor continuously acquires and processes the thermal signature of the active object during a detection period;
wherein the acquired thermal signature is divided into a plurality of portions, with each of the portions further processed to determine whether each of the portions is dynamic or static; and
when upon the thermal signature indicates that the motion of the active object is below a movement threshold, determine that the active object is inactive.

2. A system for detecting inactive objects in accordance with claim 1, wherein when the number of dynamic portions of the thermal signature is below a predetermined movement threshold, the active object associated with the thermal signature would be determined to be inactive.

3. A system for detecting inactive objects in accordance with claim 2, wherein the each of the plurality of portions are determined to be dynamic or static by measuring for any variance rates in the portion.

4. A system for detecting inactive objects in accordance with claim 3, wherein the each of the plurality of portions are determined to be dynamic if the variance rates exceed a predefined variance rate over a predefined period of time.

5. A system for detecting inactive objects in accordance with claim 4, wherein the thermal signature is an image or a stream of images captured by a thermal optical device.

6. A system for detecting inactive objects in accordance with claim 5, wherein the plurality of portions include one or more pixels of an image or stream of images.

7. A system for detecting inactive objects in accordance with claim 1, wherein the movement detection processor processes a stream of thermal images to establish the presence of the active object.

8. A system for detecting inactive objects in accordance with claim 7, wherein the movement detection processor tracks the active object within each image of the stream of thermal images and acquire new thermal signatures of the active object over a period of time.

9. A system for detecting inactive objects in accordance with claim 8, wherein the detection period is initiated when the active object is first captured within the stream of thermal images.

10. A system for detecting inactive objects in accordance with claim 9, wherein the active object is first captured within the stream of thermal images by comparing an earlier thermal image and a subsequent thermal image within the stream of thermal images.

11. A system for detecting inactive objects in accordance with claim 9, wherein the detection period is terminated when the active object is detected to leave the stream of thermal images.

12. A system for detecting inactive objects in accordance with claim 11, wherein the active object is detected to leave the stream of thermal images by comparing an earlier thermal image and a subsequent thermal image within the stream of thermal images.

13. A system for detecting inactive objects in accordance with claim 5, wherein the thermal optical device is a low resolution thermal camera.

14. A system for detecting inactive objects in accordance with claim 13, wherein the low resolution thermal camera is arranged to capture outlines of objects with minimal detail of the objects.

15. A system for detecting inactive objects in accordance with claim 5, wherein the thermal optical device is placed above a working area.

16. A system for detecting inactive objects in accordance with claim 15, wherein the working area includes one or more heat sources.

17. A method for detecting inactive objects comprising the steps of:
acquiring a thermal signature of an active object; and
processing the thermal signature of the active object to monitor for any motion of the active object, wherein the step of processing the thermal signature to monitor for any motion of the active object includes continuously acquiring and processing the thermal signature of the active object during a detection period; wherein the acquired thermal signature is divided into a plurality of portions, with each of the plurality of portions further processed to determine whether each of the plurality of portions is dynamic or static; and whenupon the thermal signature indicates that the motion of the active object is below a movement threshold, determine that the active object is inactive.

18. A method for detecting inactive objects in accordance with claim 17, wherein when the number of dynamic portions of the thermal signature is below the predetermined threshold, the thermal signature associated with the active object would be determined to be inactive.

19. A method for detecting inactive objects in accordance with claim 18, wherein the each of the plurality of portions are determined to be dynamic or static by measuring for any variance rates in the portion.

20. A method for detecting inactive objects in accordance with claim 19, wherein the each of the plurality of portions are determined to be dynamic if the variance rates exceed a predefined variance rate over a predefined period of time.

21. A method for detecting inactive objects in accordance with claim 20, wherein the thermal signature is an image or a stream of images captured by a thermal optical device.

22. A method for detecting inactive objects in accordance with claim 21, wherein the plurality of portions include one or more pixels of an image or stream of images.

23. A method for detecting inactive objects in accordance with claim 17, wherein the step of acquiring the thermal signature includes processing a stream of thermal images to establish the presence of the active object.

24. A method for detecting inactive objects in accordance with claim 23, wherein the step of acquiring the thermal signature further includes tracking the active object within each image of the stream of thermal images and acquiring new thermal signatures of the active object over a period of time.

25. A method for detecting inactive objects in accordance with claim 24, wherein the detection period is initiated when the active object is first captured within the stream of thermal images.

26. A method for detecting inactive objects in accordance with claim 25, wherein the active object is first captured within the stream of thermal images by comparing an earlier thermal image and a subsequent thermal image within the stream of thermal images.

27. A method for detecting inactive objects in accordance with claim 26, wherein the detection period is terminated when the active object is detected to leave the stream of thermal images.

28. A method for detecting inactive objects in accordance with claim 27, wherein the active object is detected to leave the stream of thermal images by comparing an earlier thermal image and a subsequent thermal image within the stream of thermal images.

29. A method for detecting inactive objects in accordance with claim 22, wherein the thermal optical device is a low resolution thermal camera.

30. A method for detecting inactive objects in accordance with claim 29, wherein the low resolution thermal camera is arranged to capture outlines of objects with minimal detail of objects.

31. A method for detecting inactive objects in accordance with claim 22, wherein the thermal optical device is placed above a working area.

32. A method for detecting inactive objects in accordance with claim 31, wherein the working area includes one or more heat sources.

* * * * *